United States Patent [19]

Harding

[11] 4,446,845
[45] May 8, 1984

[54] SELF-CONTAINED GASOLINE DRIVEN PORTABLE MASONRY SAW

[75] Inventor: Edward M. Harding, Middletown, Md.

[73] Assignee: Equipment Development Co., Frederick, Md.

[21] Appl. No.: 296,126

[22] Filed: Aug. 25, 1981

[51] Int. Cl.³ .............................................. B28D 1/04
[52] U.S. Cl. .................................................. 125/13 SS
[58] Field of Search ................. 125/13 R, 13 SS, 135; 51/98 R, 99

[56] References Cited

U.S. PATENT DOCUMENTS

| | | | |
|---|---|---|---|
| 1,095,415 | 5/1914 | Parker | 125/13 R |
| 2,320,743 | 6/1943 | Nilsen | 125/13 SS |
| 2,557,672 | 6/1951 | McGrath | 125/13 SS |
| 2,682,262 | 6/1954 | Schultz | 125/13 SS |
| 2,716,402 | 8/1955 | Harrison | 125/13 SS |
| 2,972,344 | 2/1961 | Bergen | 125/13 SS |
| 3,046,707 | 7/1962 | Obear | 125/13 R |
| 3,807,095 | 4/1974 | Harding | 125/13 SS |
| 3,838,541 | 10/1974 | Durst | 51/99 |

*Primary Examiner*—Harold D. Whitehead
*Attorney, Agent, or Firm*—Birch, Stewart, Kolasch and Birch

[57] ABSTRACT

The present invention is directed to a portable, table-type masonry saw for cutting concrete blocks, bricks, marble, tile, stone and other objects. The masonry saw includes a gasoline engine for driving a saw blade through a belt drive arrangement coupled to an arbor shaft on which the blade rotates. The gasoline engine is mounted on a stationary support while the saw blade is pivotally mounted by means of a live pivot shaft for engagement and disengagement with the workpiece. A water trough and pump are provided for wet-cutting. The water pump is connected to an output shaft of the gasoline engine through a belt drive which may be removed to permit dry-cutting of an object.

9 Claims, 3 Drawing Figures

SELF-CONTAINED GASOLINE DRIVEN PORTABLE MASONRY SAW

BACKGROUND OF THE INVENTION

1. Field of the Invention

The present invention relates to a portable, gasoline engine driven table-type masonry saw for cutting concrete blocks, bricks, marble, tile, stone and other objects.

2. Description of the Prior Art

Heretofore, masonry saws have been driven by electric motors which are mounted on a lever arm pivotally connected to a support on which a workpiece is positioned. The lever arm includes a shaft on which a saw blade is rotatably mounted. The shaft of the saw blade is operatively connected by means of belts or other drive connectors to the output shaft of the electric motor. In a conventional masonry saw, the entire lever arm together with the electric motor, the drive connection and the saw blade are pivoted on the support for the workpiece. This arrangement is suitable for an electric motor which may be operated at any disposition. In other words, an electric motor does not have to be maintained in a level state during its operation. An electric motor may be angularly disposed relative to its support without effecting the performance of the electric motor.

A number of disadvantages are encountered by utilizing a masonry saw which is powered by an electric motor. If an individual is working at a site which is not serviced by electricity, it is extremely inconvenient or impossible to operate an electric motor. Further, in utilizing a masonry saw, it is conventional to employ water to "wet-cut" the workpiece. By using an electric motor, it is necessary to provide waterproof safety power switches and other safety features to ensure the safety of the individual operating the masonry saw.

Gasoline-powered masonry saws are disclosed in the prior art. Hirth, U.S. Pat. No. 2,159,699, discloses a concrete cutting device wherein a saw blade 35 is operatively connected by means of the belt drive 31 to a gasoline-powered engine 34. As illustrated in FIG. 2 of Hirth, the support pin is mounted on wheels 26, 26' for supporting the engine 34 and the axis of the saw blade 35. The wheels 26 may be angularly disposed relative to the plane of the support pin. In this manner, the gasoline-powered engine 34 is tilted at an angle with respect to the horizontal. Thus, problems can develop in the operation of the gasoline engine 34 due to the angular disposition of the oil within the crankcase. In other words, the lubrication of the gasoline-powered engine 34 will be adversely effected when the engine is tilted relative to the horizontal.

Griswold et al, U.S. Pat. No. 925,333, discloses a circular stone saw. The saw blade 8 is mounted on a shaft 7 which is operatively connected to a drive shaft 3 by means of a belt drive 11. This device is a relatively large structure which is not portable.

McCain, U.S. Pat. No. 2,308,703, discloses a cutting apparatus for cutting quartz crystal slabs from "mother" crystals. A plurality of circular saw blades 34 are mounted on a shaft 33 which is operatively connected to an electric motor 119. It is important to note that the shaft 33 on which the circular saw blades 34 are disposed is permanently positioned relative to the side walls 26. The shaft 33 may not be tilted relative to the support frame 26.

Konway, U.S. Pat. No. 2,783,789, discloses a power driven circular saw. A gasoline engine 76 is securely mounted on a support frame 36. The support frame 36 is positioned on wheels 21. A saw blade 75 is mounted on a shaft 69 which is operatively connected by a pulley and gear arrangement to the gasoline-powered engine 76. A crank 62 is provided to vertically adjust the saw blade 75 relative to a workpiece.

Wilson, U.S. Pat. No. 2,889,141, discloses a mobile concrete saw device which is operated by a gasoline engine. The gasoline engine 12 is mounted on a frame 10 which is supported on wheels 58. A saw blade 44 is positioned on a shaft 28 which is operatively connected to the gasoline engine 12 by means of belts 54. This device is used to saw concrete slabs on a highway. The device disclosed by Wilson is not a portable, table-type gasoline-powered masonry saw.

Henderson et al, U.S. Pat. No. 3,248,152, discloses a vehicular router having a vertical cylindrical tool. A gasoline-powered engine 5 is positioned on a horizontal support B mounted on wheels W. A cutting tool 60 is operatively connected to a motor 61 which is supplied with current through a line L' extending from the motor though the guide G into the generator unit. Again, the device disclosed by Henderson et al is designed to be operated in a horizontal position and does not include a cutting member designed to be tilted relative to the drive motor.

Simmons, U.S. Pat. No. 3,271,079, discloses a pavement cutter. An engine 114 is positioned on a frame 12. A saw blade 50 is mounted on a bushing 62 which is operatively connected to the engine 114 to impart rotation thereto.

Stoljarov et al, U.S. Pat. No. 3,360,298 discloses a stone cutting machine with a mobile carriage. Electric motors are provided for rotating a plurality of cutter blades 28 and 36. This device is somewhat comparable to a conventional electrically powered masonry saw. In addition, this device is somewhat equivalent to the other prior art patents discussed hereinabove in that it is an extremely large machine which is designed to be operated by an individual seated in the chair 14.

SUMMARY AND OBJECTS OF THE INVENTION

It is an object of the present invention to provide a portable, table-type gasoline-powered masonry saw which is easy to use for cutting concrete blocks, bricks, tile, stone and other material.

Another object of the present invention is to provide a gasoline-powered masonry saw wherein the gasoline driven engine is mounted in a stationary manner in a substantially horizontal plane on a support structure of the device. A live pivot shaft is operatively mounted on a pivoting support arm and on an engine mount for the gasoline driven engine. A saw blade is disposed on an arbor shaft which is operatively connected to the gasoline driven engine and said live pivot shaft by means of sheaves and flexible belts. The arbor shaft on which the masonry saw is rotatably disposed is secured to the support arm which may be pivoted to engage and disengage the masonry saw with a workpiece without changing the substantially horizontal position of said gasoline driven motor.

A further object of the present invention is to provide a gasoline-powered masonry saw which includes a pump selectively, operatively connected to the gasoline driven engine for pumping a fluid from a trough disposed below the workpiece onto the masonry saw blade for providing a "wet-cut".

A further object of the present invention is to provide a portable, table-type gasoline-powered masonry saw wherein the support arm of the shaft of the masonry saw blade is connected to a support structure of the device with an over-center type spring arrangement to facilitate the use of the support arm during cutting of a workpiece.

These and other objects of the present invention are accomplished by providing a portable, table-type gasoline-powered masonry saw including a trough base member and a support stand projecting vertically upwardly therefrom. The support stand includes an engine mount on which a gasoline-powered engine is affixed though vibration dampening members. A live pivot shaft is operatively mounted on a pivoting support arm and on the engine mount. A masonry saw blade is operatively positioned on an arbor shaft affixed to the support arm which is pivotally mounted to the support stand. A series of sheaves and flexible belts are provided to impart motion from the output shaft of the gasoline-powered engine to the live pivot shaft and thereafter to the arbor shaft of the masonry saw blade. A pump is operatively connected to the gasoline-powered engine by means of sheaves and a flexible belt drive for pumping liquid from the trough base to a point adjacent the masonry saw blade. In this manner, the gasoline-powered masonry saw of the present invention may provide a "wet-cut" of a workpiece. The support arm which is pivotally connected to the support stand is connected by an over-center spring arrangement to facilitate the use of the support arm by an individual.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood from the detailed description given hereinbelow and the accompanying drawings with which are given by way of illustration only, and thus are not limitative of the present invention and wherein.

DETAILED DESCRIPTION OF THE INVENTION

Figure 1:
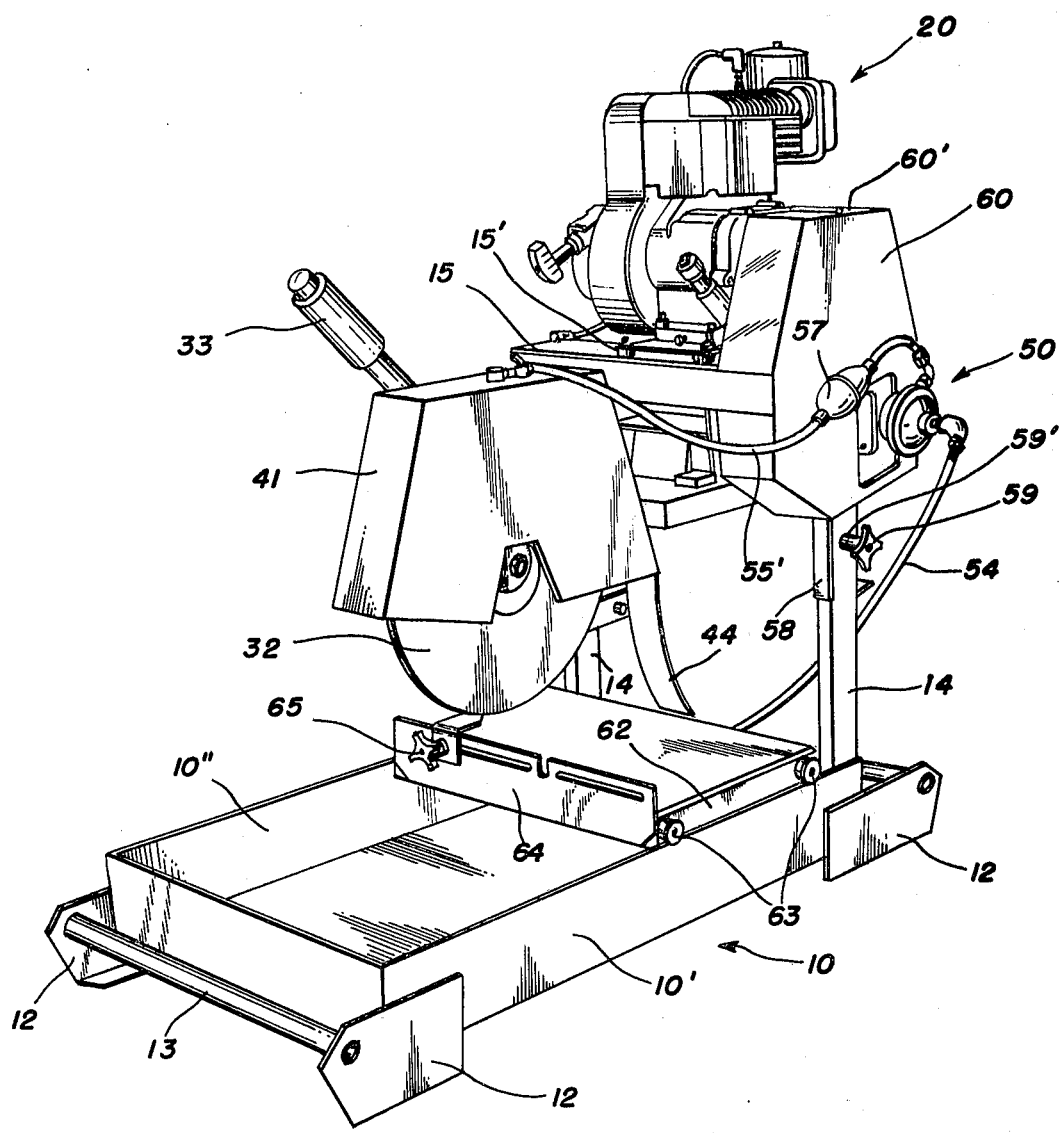
FIG. 1 is a perspective view illustrating the portable, table-type gasoline-powered masonry saw.
Figure 2:
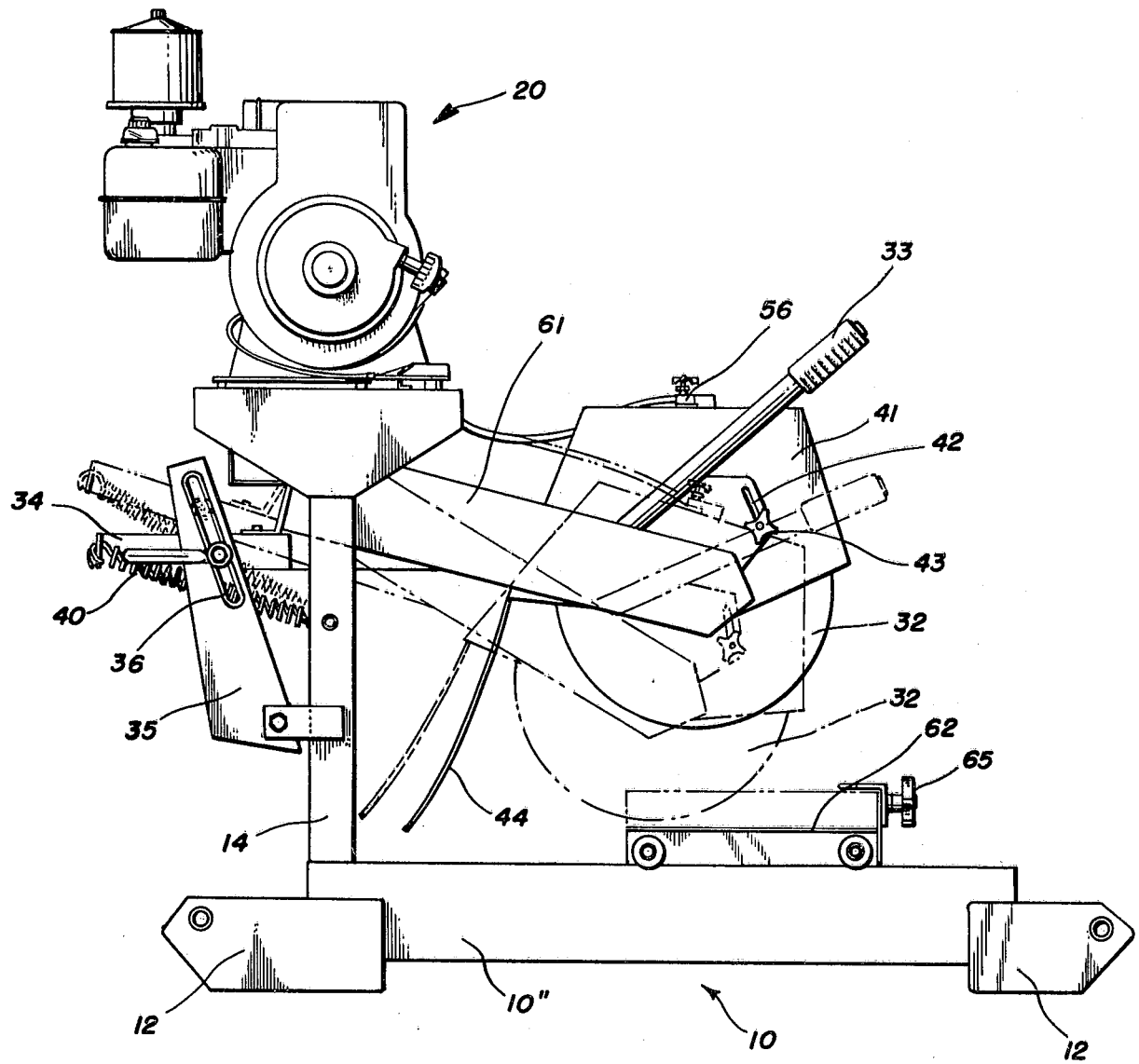
FIG. 2 is a side view illustrating the gasoline-powered masonry saw with the support arm shown in solid lines in the disengaged position and shown in dotted lines in an engaged position of the masonry saw blade with a workpiece.
Figure 3:
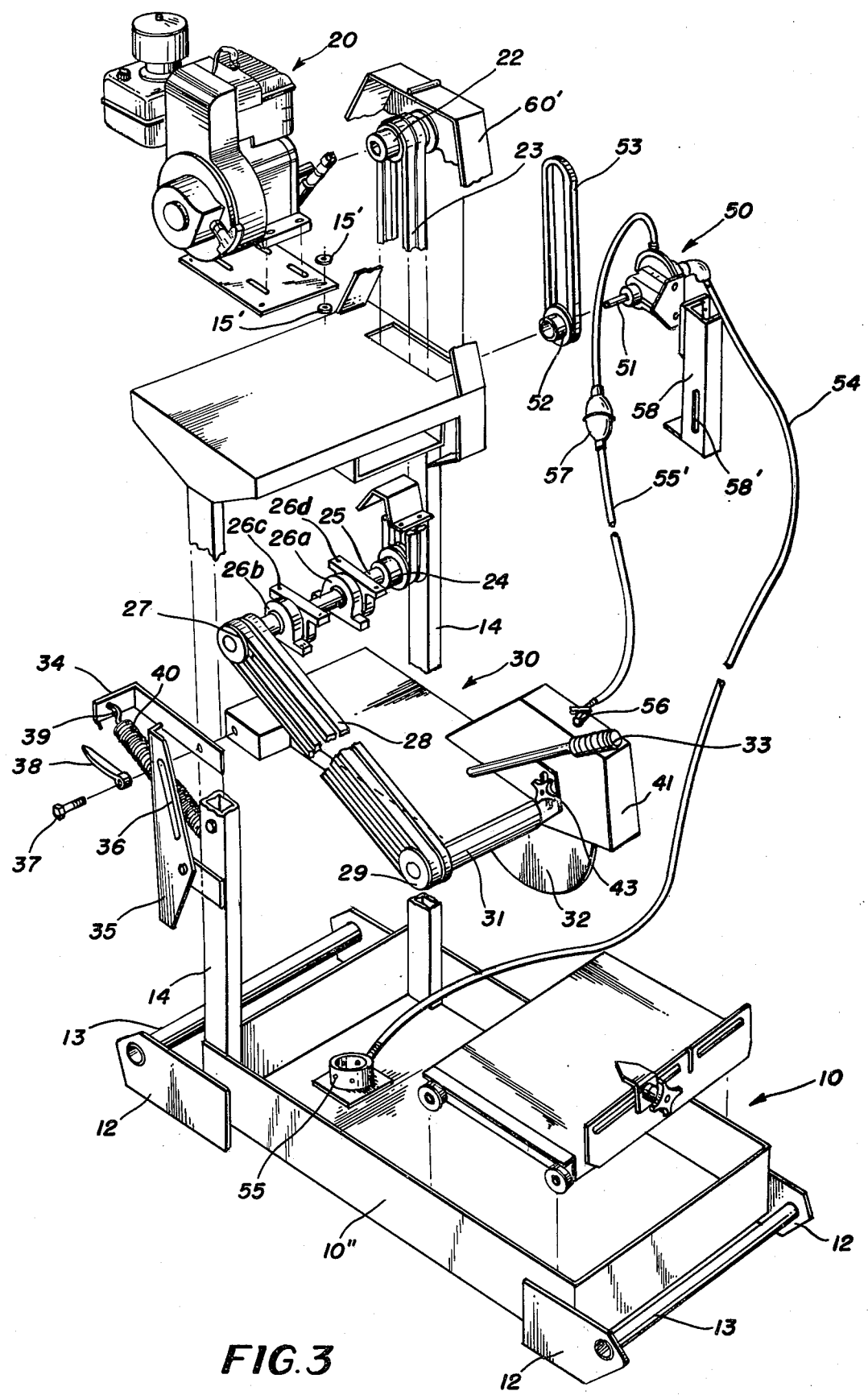
FIG. 3 is an exploded view of the gasoline-powered masonry saw according to the present invention.

As illustrated in FIGS. 1-3, a trough base 10 is provided with support legs 12 disposed on the four corners thereof. Carrying handles 13 are operatively positioned between respective pairs of the support legs 12 at each end of the trough base 10. A support stand 14 is orthogonally mounted to one end of the trough base 10. An engine mount 15 is affixed to the upper end of the support stand. The engine mount 15 transverses the width dimension of the trough base 10 and is disposed a predetermined distance thereabove.

A gasoline-powered engine 20 is affixed to the engine mount 15 through anti-vibration mounts 15'. The anti-vibration mounts 15' may be constructed of neoprene. The gasoline-powered engine 20, the engine mount 15, the support stand 14 and the trough base 10 are all secured relative to each other so as to form a stationary support structure. In this manner, oil which lubricates the gasoline-powered engine is always disposed in an operative position within the crankcase. In other words, the gasoline-powered engine 20 is never tilted relative to the trough base 10 to interfere with the lubrication of the oil within the crankcase. The gasoline-powered engine 20 is secured in a fixed position so as to ensure optimum performance of the gasoline-powered engine.

The gasoline-powered engine 20 includes an output shaft 21 which is affixed to a sheave 22. A flexible drive belt 23 is operatively connected to the sheave 22 and to a lower sheave 24. The lower sheave 24 is affixed to a live pivot shaft 25 which is mounted within bearings 26a, 26b to the upper surface of a support arm 30 and is mounted within bearings 26c, 26d to the lower surface of the engine mount 15. In this manner, the live pivot shaft may rotate while permitting pivoting between the support arm 30 and the stationary support structure 10, 14 and 15. A second lower sheave 27 is affixed to the other end of the live pivot shaft 25. A second flexible drive belt arrangement 28 is operatively connected to the second lower sheave 27 and to an arbor shaft sheave 29. The arbor shaft sheave 29 is affixed to an arbor shaft 31 which is mounted for rotation on the support arm 30 and is operatively connected to the masonry saw blade 32.

As illustrated in FIGS. 2 and 3, the support arm 30 is pivotally connected relative to the support stand 14 by means of the live pivot shaft 25 and the bearings 26a, 26b, 26c and 26d. The arbor shaft sheave 29 and the arbor shaft 31 are operatively connected to one end of the support arm 30. An operating lever 33 is affixed to the support arm 30 to enable an individual to engage or disengage the masonry saw blade 32 with a workpiece.

The support arm 30 includes an outwardly projecting L-shaped bracket 34 which extends to the rear thereof. A guide frame 35 is affixed to the support stand 14 and includes an elongated slot 36 disposed therein. A bolt 37 extends though a handle 38 and the elongated slot 36 and is secured to the L-shaped bracket 34. The outer end of the L-shaped bracket 34 includes an opening 39 through which one end of a spring 40 is positioned. The other end of the spring 40 is secured to the support stand 14. The spring 40 and the L-shaped bracket 34 together with the guide frame 35 provide an over-centered spring arrangement to aid an individual in engaging and disengaging the masonry saw blade 32 with a workpiece.

A housing 41 which surrounds the upper surface of the masonry saw blade 32 is mounted on the support arm 30. As illustrated in FIG. 2, the housing 41 is movably mounted relative to the support arm 30 within a guide slot 42. A securing knob 43 is utilized to affix the housing 41 relative to the support arm 30. A splash-preventer 44 is connected to the posterior portion of the housing 41.

As illustrated in FIGS. 1 and 3, a pump unit 50 is affixed to the support stand 14. The pump unit 50 includes an input shaft 51 which is operatively connected to a sheave 52. The sheave 52 is affixed by means of a flexible belt 53 to the sheave 22. In this manner, as the output shaft 21 of the gasoline-powered engine 20 rotates the sheave 22, the drive belt 53 imparts rotation to the sheave 52 to drive the input shaft 51 of the pump 50.

The pump 50 is connected by means of a tube 54 to a fluid receiving member 55. This arrangement permits fluid disposed within the trough base 10 to be pumped upwardly into the pump member 50 and thereafter through the tube 55' to a spray head 56 disposed on the upper surface of the housing 41. The spray head 56 sprays fluid onto the masonry saw blade 32 to cool the blade and the workpiece during a "wet-cutting" operation. A bulb 57 is disposed within the flow path of the tube 55' so as to permit priming of the pump 50 during initial start-up operation.

As illustrated in FIG. 1, the pump assembly 50 is connected to the support stand 14 by means of a channel or pump bracket 58 and a connecting knob 59. The connecting knob 59 is positioned on a carriage bolt 59' which extends though a hole in the support stand 14 and through the elongated slot 58'. If it is desired to dry-cut a workpiece, an individual would merely adjust the knob 59 to loosen the carriage bolt 59' to permit the pump assembly 50 to be moved upwardly so as to disconnect the sheave 52 from the flexible drive belt 53. Thereafter, the gasoline-powered masonry saw may be utilized to dry-cut a workpiece. As illustrated in FIG. 1, a housing 60 with access door 60' is positioned over the output shaft 21 of the gasoline-powered engine 20 and the sheave 22 and flexible drive belts 23, 53. By raising the access door 60' an individual may service the flexible drive belts 23, 53. In addition, if it is desired to disconnect the pump assembly 50 for dry-cutting, an individual may actually disengage the flexible drive belt 53 from either the sheave 22 or the sheave 52 by gaining access through the access door 60'.

The housing 60 acts as a safety shield to prevent injury to an operator. Similarly, as illustrated in FIG. 2, a safety shield 61 is disposed over the second lower sheave 27, the drive belt 28 and the arbor shaft sheave 29. The safety housing 61, 60 and the housing 41, all serve to prevent injury to an operator of the gasoline-powered masonry saw.

As illustrated in FIGS. 1-3, a workpiece support 62 is mounted on wheels 63 which engage the side walls 10', 10" of the trough base 10. In this manner, the workpiece support 62 may be easily moved into position below the masonry saw blade 32 to actually sever a workpiece. The workpiece support 62 includes an end wall 64 and a guide member 65. The end wall 64 and the guide member 65 are utilized to accurately cut a workpiece positioned on the workpiece support 62.

In operation, a workpiece is initially positioned on the workpiece support 62 with the workpiece support disposed at a position removed from the masonry saw blade 32. The workpiece is accurately positioned relative to the workpiece support 62 and thereafter the workpiece support 62 is moved in the direction of the masonry saw blade 32. An operator would then grasp the operating lever 33 and pivot the masonry saw blade 32 operatively connected to the support arm 30 into engagement with the workpiece.

As illustrated in FIG. 2, the support arm 30 would be pivoted downwardly from the solid line position to the dotted line position. In this position the workpiece would be severed along a desired line. The support arm 30 is pivoted relative to the support stand 14 and the motor mount 15. In other words, the gasoline-powered engine 20 is stationarily positioned relative to the stationary support structure 10, 14 and 15. In this manner, oil disposed within the crankcase of the gasoline-powered engine 20 is always properly disposed therein to lubricate the various elements of the gasoline-powered engine.

The pivoting of the support arm 30 relative to the stationary support structure 10, 14 and 15 is possible through the arrangement of the live pivot shaft 25. The live pivot shaft 25 is mounted in bearings 26a, 26b which are affixed to the support arm 30. In addition, the live pivot shaft 25 is mounted in bearings 26c, 26d which are affixed to the engine mount 15. In this manner, the support arm 30 may be pivoted relative to the stationary support structure 10, 14 and 15 about the rotating live pivot shaft 25.

Although the support arm 30 is pivotable relative to the stationary support structure 10, 14 and 15, rotation is transmitted from the gasoline-powered engine 20 to the live pivot shaft 25 through the output shaft 21, the sheaves 22, 24 and the flexible drive belt 23. The rotation is transmitted from the live pivot shaft 25 to the arbor shaft 31 and the saw blade 32 through the sheaves 27, 29 and the flexible drive belts 28.

Reference has been made in the present invention to a gasoline-powered engine and to sheaves and flexible drive belts. It is to be understood that any self-contained internal combustion engine powered by alcohol, propane, gasoline, diesel fuel or other fuel may be utilized. In addition, drive means other than sheaves and flexible drive belts may transmit rotation from the output shaft 21 to the arbor shaft 31.

The invention being thus described, it will be obvious that the same may be varied in many ways. Such variations are not to be regarded as a departure from the spirit and scope of the invention, and all such modifications are intended to be included within the scope of the following claims.

I claim:

1. A portable saw for cutting a workpiece comprising:

a base member adapted to be disposed in a first substantially horizontal plane;

a support stand affixed to said base member and projecting upwardly therefrom;

an engine mount affixed to said upwardly projecting support stand and being disposed in a second, fixed substantially horizontal plane displaced upwardly from said first horizontal plane;

an internal combustion engine affixed to said engine mount in a predetermined fixed substantially horizontal disposition and including an output shaft;

a support arm operatively connected to said engine mount and projecting from said support stand, said support arm including an L-shaped bracket projecting from the posterior thereof and a spring being attached to said L-shaped bracket and said support stand in an over-centered arrangement to aid an individual in pivoting the support arm into engagement or disengagement with a workpiece;

a live pivot shaft for pivotally connecting said support arm to said engine mount;

a saw blade positioned on an arbor shaft affixed to said support arm; and drive means operatively connected to said output shaft of said internal combustion engine, said live pivot shaft and said arbor shaft on which said saw blade is positioned for imparting rotation from said output shaft to said saw blade while permitting relative vertical displacement of said arbor shaft relative to said output shaft;

said support arm being pivotally mounted relative to said engine mount to engage or disengage said saw blade with a workpiece without changing the disposition of said second substantially horizontal plane of said engine mount and said predetermined fixed substantially horizontal disposition of said internal combustion engine affixed thereto.

2. A portable saw for cutting a workpiece according to claim 1, wherein said drive means includes a plurality of flexible drive belts operatively connected to sheaves for transmitting rotation from said engine output shaft through said live pivot shaft to said arbor shaft on which said saw blade is positioned.

3. A portable saw for cutting a workpiece according to claim 1, wherein the internal combustion engine is a gasoline-powered engine.

4. A portable saw for cutting a workpiece according to claim 1, wherein said base member is a trough for containing a fluid and further including a pump means selectively operatively connected to said output shaft and operatively connected to said trough for pumping fluid from said trough to said saw blade.

5. A portable saw for cutting a workpiece according to claim 1, and further including a workpiece support operatively mounted on said base and movable to position a workpiece relative to said saw blade.

6. A portable saw for cutting a workpiece according to claim 1, wherein said saw blade is a masonry saw blade.

7. A portable saw for cutting a workpiece according to claim 5, and further including a housing mounted adjacent said saw blade and a spray head operatively connected to said pump for spraying fluid on said saw blade within said housing.

8. A portable saw for cutting a workpiece according to claim 2, and further including a safety housing disposed around said plurality of flexible drive belts.

9. A portable saw for cutting a workpiece according to claim 1, and further including an operating lever affixed to said support arm to aid in engaging and disengaging said saw blade with a workpiece.

* * * * *